No. 858,583. PATENTED JULY 2, 1907.
M. E. DOAN.
HEATING DEVICE.
APPLICATION FILED MAR. 23, 1906.

Witnesses
Inventor
Mary Ellen Doan
By
Attorney

UNITED STATES PATENT OFFICE.

MARY ELLEN DOAN, OF NEWTOWN, PENNSYLVANIA.

HEATING DEVICE.

No. 858,583.   Specification of Letters Patent.   Patented July 2, 1907.

Application filed March 23, 1906. Serial No. 307,600.

*To all whom it may concern:*

Be it known that I, MARY ELLEN DOAN, a citizen of the United States, residing at Newtown, in the county of Bucks and State of Pennsylvania, have invented new and useful Improvements in Heating Devices, of which the following is a specification.

This invention relates to a heating device, or what may be termed a fireless stove, and the primary object of the same is to minimize the cost of fuel for cooking purposes and provide simple and effective means for maintaining cooked articles of food in heated condition, or in some instances to complete the cooking operation in the improved device, which is sealed and has the additional advantage of preserving the strength, flavor and shape of the articles kept heated or cooked in this manner, for the reason that there is no evaporation or boiling to pieces, as when cooked on an ordinary stove.

Time and labor, as well as fuel, are saved by the use of the improved device, because it does not require watching to prevent burning of the articles of food, and is thereby exceptionally convenient and safe in its operation.

Figure 1:
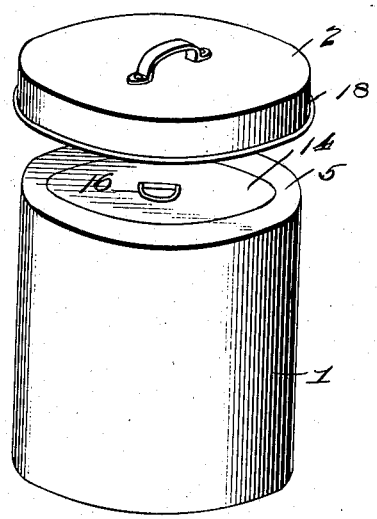
Figure 2:
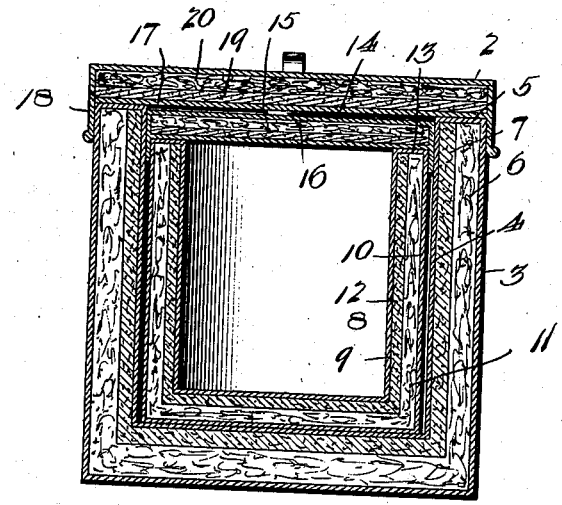

In the accompanying drawings, Figure 1 is a perspective view of the improved heating device showing the outer lid or cover removed. Fig. 2 is a transverse vertical section of the same with the outer lid or cover applied.

Similar numerals of reference are employed to indicate corresponding parts in the views.

The numeral 1 designates an outside receptacle or kettle, preferably made of tin, and having a removable cover 2, which will be more fully hereinafter described as to its details of structure. The receptacle or kettle 1 comprises an outer shell or wall 3 and an inner wall 4 surrounding the side of the same and spaced a suitable distance, and also continued through the bottom, as clearly shown by Fig. 2. The upper terminal of the side wall, as at 5, is sealed, and within the space between the walls 3 and 4 is a filling 6, of hay or analogous material, tightly packed therein and against a lining 7 secured against the wall 4, and composed of plaster of paris, asbestos and alum in suitable proportions.

Within the receptacle 1 is a separate receptacle 8, having inner and outer walls 9 and 10 spaced from each other similarly to the walls 3 and 4, and also preferably provided with a packing, as at 11, similar to the packing 6, and a lining 12 similar to the lining 7. The upper ends of the side wall of this inner receptacle are sealed, as at 13, and removably disposed on the said inner receptacle is an inside cover 14, also packed, as shown, and comprising double walls which are spaced to receive the packing, as at 15. The cover 14 has a central grip or handle 16, which is preferably foldable so that it may be laid flat on the top of said cover.

Over the outer receptacle the lid or cover 2 is fitted and is provided with a metallic partition 17 at a distance from the lower edge thereof to form a flange 18 and provide sufficient space to permit the lower portion of the cover to fit over and embrace the upper part of the side of the outer receptacle 1. This flange 18 facilitates the formation of a tight joint, and the partition 17 provides with the top of the cover a space which is filled with a lining 19, composed of a composition of plaster of paris, asbestos and alum in suitable proportions, and above this is a packing 20, or rather a layer of cotton waste, held in place by the partition which is secured to the flange 18. It will be observed that the fillings or packings and the linings, as set forth, serve as heat containing means and are entirely inclosed and therefore will always be clean and in wholesome condition, as nothing can reach the same that might have a tendency to contaminate them and affect the contents of the innner receptacle. The flange 18 of the outer lid or cover 2 fits snugly over the upper portion of the outer receptacle 1, and by such means the use of complicated fastening devices is dispensed with. The inner receptacle 8 serves as a heating or a cooking vessel, and therein are disposed the articles of food to be kept in heated condition or to be cooked.

Before the articles of food are placed in the inner receptacle 8 the entire device is suitably heated and the fillings or packings and linings take up and absorb the heat and hold the same and give it off to the inner receptacle, and through the latter it is imparted to the articles of food contained in said inner receptacle.

It will be seen that when the articles of food are in the receptacle 8 and the lids or covers 14 and 2 are applied, that such articles of food will be sealed and the surrounding air excluded therefrom, and furthermore that no vapors will be formed or the flavors of the articles of food destroyed, and hence material advantage will result in the palatable quality of the articles of food so treated.

The inner and outer receptacles can be cleaned and maintained in cleaned condition, and likewise the lids or covers, and it will be understood that changes in the proportions, dimensions and minor details may be adopted at will without departing from the spirit of the invention.

Having thus described the invention, what is claimed, is:

In a heating device of the class specified, the combination of inner and outer receptacles, each having double walls, the inner walls being provided with linings composed of a composition of plaster of paris, asbestos and alum, packings or layers between the said linings and bearing against the latter and the outer walls, the inner receptacle being of less diameter than the space formed by the inner wall of the outer receptacle, a lid or cover removably applied over the inner receptacle, and a lid or cover removably applied over the outer receptacle, both lids or covers having inner and outer walls or formed hollow and provided with packings.

In testimony whereof, I affix my signature in presence of two witnesses.

MARY ELLEN DOAN.

Witnesses:
H. G. REEDER,
ELIZABETH S. O'NEIL.